United States Patent
Vijayaraghavan et al.

(10) Patent No.: US 9,275,342 B2
(45) Date of Patent: Mar. 1, 2016

(54) METHOD AND APPARATUS FOR INTENT MODELING AND PREDICTION

(71) Applicant: 24/7 CUSTOMER, INC., Campbell, CA (US)

(72) Inventors: Ravi Vijayaraghavan, Bangalore (IN); Subhash Ramchandra Kulkarni, Bangalore (IN); Kranthi Mitra Adusumilli, Hyderabad (IN)

(73) Assignee: 24/7 Customer, Inc., Campbell, CA (US)

( * ) Notice: Subject to any disclaimer, the term of this patent is extended or adjusted under 35 U.S.C. 154(b) by 288 days.

(21) Appl. No.: 13/852,942

(22) Filed: Mar. 28, 2013

(65) Prior Publication Data
US 2013/0268468 A1 Oct. 10, 2013

Related U.S. Application Data

(60) Provisional application No. 61/621,903, filed on Apr. 9, 2012.

(51) Int. Cl.
| | |
|---|---|
| *G06N 5/00* | (2006.01) |
| *G06N 99/00* | (2010.01) |
| *G06Q 30/02* | (2012.01) |
| *G06Q 30/06* | (2012.01) |

(52) U.S. Cl.
CPC .............. *G06N 99/005* (2013.01); *G06Q 30/02* (2013.01); *G06Q 30/06* (2013.01); *G06N 5/00* (2013.01)

(58) Field of Classification Search
None
See application file for complete search history.

(56) References Cited

U.S. PATENT DOCUMENTS

| | | | |
|---|---|---|---|
| 6,262,730 B1 * | 7/2001 | Horvitz et al. | 715/707 |
| 2010/0131835 A1 | 5/2010 | Kumar et al. | |
| 2011/0055008 A1 | 3/2011 | Feuerstein et al. | |

OTHER PUBLICATIONS

Augustin, et al., Telephony Fraud Detection in Next Generation Networks, AICT 2012: The Eighth Advanced International Conference on Telecommunications, 2012, pp. 203-207.*
Austin, Peter C. , "An Introduction to Propensity Score Methods for Reducing the Effects of Confounding in Observational Studies", Multivariate Behav Res., vol. 46, Issue 3, retrieved online on Mar. 12, 2013 from url: http://www.ncbi.nlm.nih.gov/pmc/articles/PMC314483, May 2011, pp. 399-424.
Green, F. et al., "Big Conversion Gains From a Little Scissors & Grease?", MECLABS, retrieved online on Mar. 12, 2013 from url: www.marketingexperiments.com/improving-website-conversion/landing-page-conversion-gains.html, Jun. 27, 2007, 6 pages.
Kirkpatrick, David , "Marketing 101: What is conversion?", marketingsherpa BLOG, retrieved online on Mar. 12, 2013 from url: http://sherpablog.marketingsherpa.com/marketing/conversion-defined, Mar. 15, 2012, 5 pages.

* cited by examiner

*Primary Examiner* — Wilbert L Starks
(74) *Attorney, Agent, or Firm* — Perkins Coie LLP

(57) ABSTRACT

A method and apparatus enables identification of customer characteristics and behavior, and predicts the customer's intent. Such prediction can be used to adopt various business strategies to increase the chances of conversion of customer interaction to a sale, and thereby can increase revenue, and/or enhance the customer's experience.

18 Claims, 7 Drawing Sheets

METHOD AND APPARATUS FOR INTENT MODELING AND PREDICTION

CROSS REFERENCES AND RELATED APPLICATIONS

This application claims priority to U.S. provisional patent application Ser. No. 61/621,903, filed Apr. 9, 2012, the entirety of which is incorporated herein by this reference thereto.

BACKGROUND OF THE INVENTION

1. Technical Field

The invention relates to improving customer experiences. More particularly, the invention relates to discovering and predicting customer intent to improve the customer experience.

2. Description of the Background Art

The rapid adoption of the Internet and other communication technologies over the last decade has changed the way people buy products and services. While e-commerce is convenient for buyers and sellers alike, there are certain challenges faced by businesses if they are to serve their prospective clients effectively.

In traditional commerce, a customer's intent may be determined by observing the customer's behavior, body language, voice, and what the customer asks for. The best way to help a customer may be inferred based on age, sex, physical disability, socioeconomic status, etc. For example, a female wanting to buy a dress may be directed to different parts of the store depending on whether she is a teenager, an elderly woman, or overweight. A large, muscular, able-bodied man is unlikely to receive an offer to help carry his groceries out to the car.

However, it is more difficult to anticipate the needs of a customer visiting a website to engage in e-commerce because of the lack of personal information that Internet anonymity provides. It becomes more difficult to identify user needs and, as a result, it is difficult to offer useful help, or to recommend products or services, to the customer. While in a traditional brick and mortar store it may be possible to identify whether a prospective consumer is looking to buy a particular product or service, or is just window shopping, as indicated by the intensity of interest shown and questions asked, the same clues are not available from a prospective consumer in an online store.

SUMMARY OF THE INVENTION

A presently preferred embodiment of the invention provides a method and apparatus that enables identification of customer characteristics and behavior, and that predicts the customer's intent. Such prediction can be used to adopt various business strategies dynamically to increase the chances of conversion of customer interaction to a sale, and thereby increase revenue, and/or enhance the customer's experience.

DETAILED DESCRIPTION

A presently preferred embodiment of the invention provides a method and apparatus that enables identification of customer characteristics and behavior, and that predicts the customer's intent. Such prediction can be used to adopt various business strategies dynamically to increase the chances of conversion of customer interaction to a sale, and thereby increase revenue, and/or enhance the customer's experience.

Terminology

The following terms have their ascribed meaning herein:

Conversion

Conversion is the point at which a recipient of a marketing message performs a desired action. In other words, conversion is getting someone to respond to a call-to-action. For example, getting someone to open an email is a conversion. Having them click on the call-to-action link inside that email is another conversion. Going to the landing page and filling out a registration form to read content is a conversion. And buying a product is a conversion.

Channel Friction

When prospective customers arrive at a website, they come with a specific intention or motivation. They may have come to browse or out of curiosity or by mistake. However, many come with the intention of making a purchase. For those prospects, it is the efficacy of the website's purchase funnel, i.e. the pages that make up the buying process, that determines whether the visitor becomes a customer or merely a statistic.

Among the factors that influence the probability of conversion, an element referred to as friction is key for marketers. The reason is that, unlike motivation or the product factors of value proposition, friction is something that can be significantly influenced with comparatively little energy or cost; and the conversion gains received can be disproportionately high compared with the level of investment. A channel friction metric can be expressed in the form of a channel friction score.

Deflection

Call deflection is the tactic of making alternative customer service channels available to deflect calls made to a telephone center.

Discussion

Figure 1:
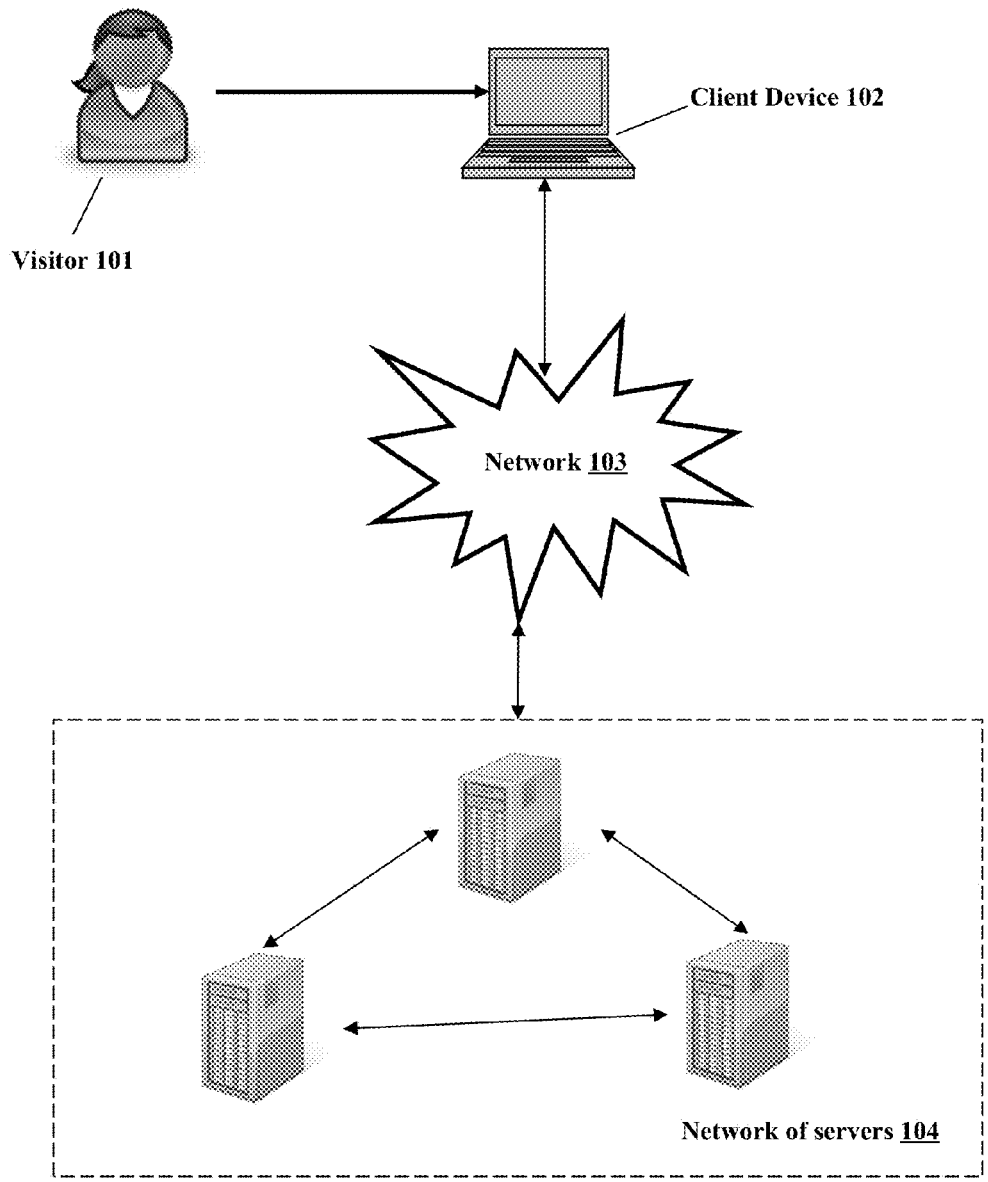
FIG. 1 is a block schematic diagram that depicts customer interaction with a website and its associated modules according to the invention.

FIG. 1 is a block schematic diagram that shows customer interactions with a website and its associated modules according to the invention. A customer engaging in business remotely using electronic devices is referred to herein as a visitor to the electronic business. FIG. 1 depicts a visitor 101 interacting with a Web server or application server 201 using a suitable medium, such as the Internet, via a client device 102, such as a personal computer or wireless handheld device.

The visitor 101 may interact with the servers 104 during the course of the visitor's access to a Web site hosted on the servers 104.

The servers 104 segment visitors into one or more of a plurality of homogenous groups based on a plurality of factors comprising, for example, locations of the visitors, demographic info of the visitor (if available), time of visit, referral page, landing and/or exit pages, visitor interaction information, past purchase history, and so on. The groups may be formed on the basis of observed behavior of the visitors. Examples of groups include visitors who are likely to view certain specific products, such as sports, electronics, or books written on health and nutrition topics; visitors who belong to a younger age group; visitors who are looking for information, referred to herein as information seekers; visitors who casually visited a website, referred to herein as browsers; visitors who come from the same location, who more frequently browse on weekends, and so on. Group identification may be based on the above mentioned plurality of factors. The servers 104 further develop models for visitor behavior for each of the groups.

On detecting a visitor 101 accessing an application served by the servers 104, characteristics of the visitor, such as location of the visitor, time of visit, referral page, landing and/or exit pages, visitor interaction information, past purchase history, and so on, are identified. The servers 104 further perform the steps of categorizing the visitor into one or more pre-defined groups of visitors (if such groups exist), modeling the visitor behavior with respect to the previous population of visitors in the relevant groups identified, and predicting the intention of the visitor 101 based on modeling of the visitor's behavior. The servers 104, based on the predicted intent, may proactively offer suitable personalized recommendations and/or best multichannel support to the visitor 101. Multichannel support refers to various means of communicating with, and providing support to, the customer, such as through chat, email, telephone contact, video conferencing, etc.

Figure 2:
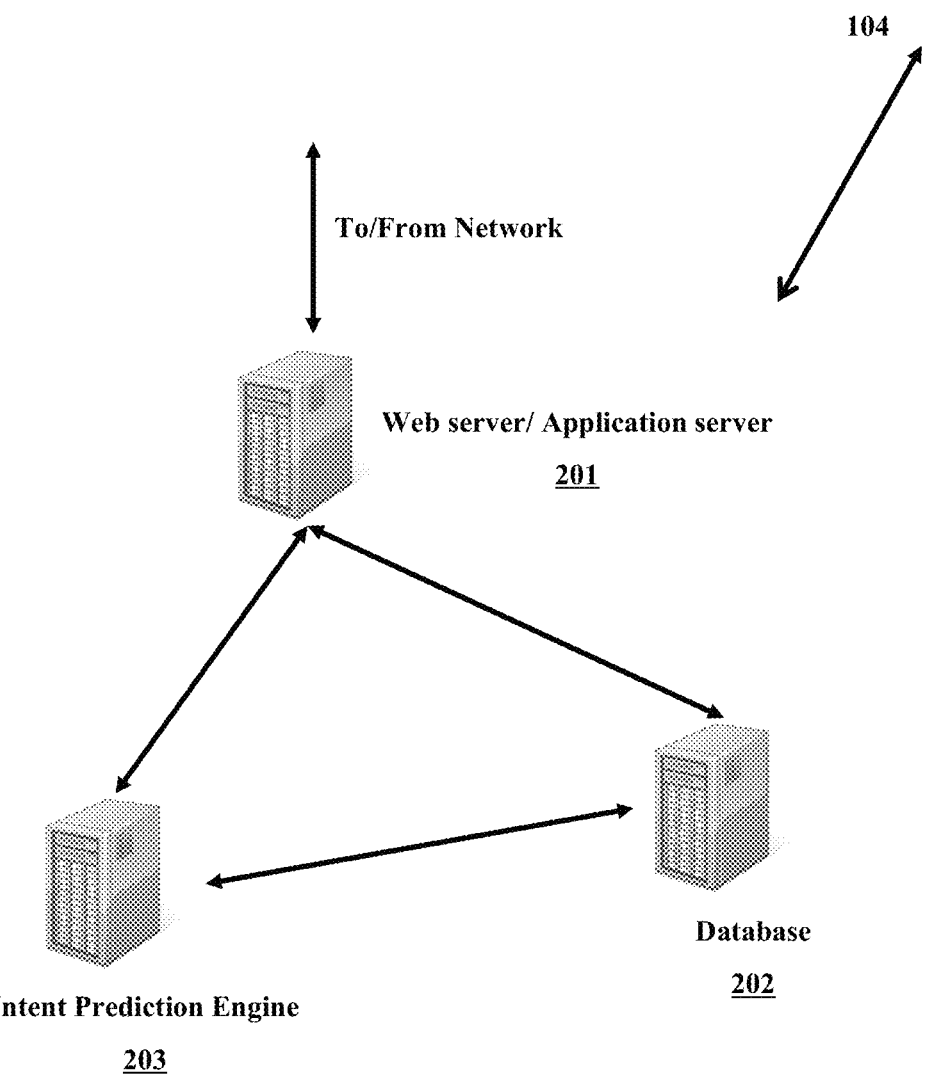
FIG. 2 is a block schematic diagram that depicts the network of servers according to the invention.

FIG. 2 is a block schematic diagram that shows a network of servers according to the invention. The network of servers 104 comprises a server 201, which may be, for example, a Web server or an application server, a database 202, and an intent prediction engine 203. The server 201 serves an application, which may be, for example, a Web-based application, to visitors 101 via the client machine 102 via the network. The server 201 is connected to at least one database 202 and an intent prediction engine 203, each of which is in turn connected with the other.

The server 201 stores a plurality of factors related to each visitor to the server 201 in the database 202 The plurality of factors comprise, for example, locations of the visitors, time of visit, referral page, landing and/or exit pages, visitor interaction information, past purchase history, and so on. The intent prediction engine 203 fetches the above mentioned plurality of factors, segments the visitors based on the factors, and builds a model for visitor behavior based on the same. Probabilistic latent semantic analysis (PLSA) clustering method or Self-organizing maps which are more suitable for segmenting online visitors behavior can be used to segment the visitors into homogenous groups like browsers, interested in certain products etc. The intent prediction engine 203 stores the segment labels along with the weights determined by the PLSA of the important attributes and/or combination of attributes such as location, products viewed, past purchases and so on within the database 202.

Figure 3:
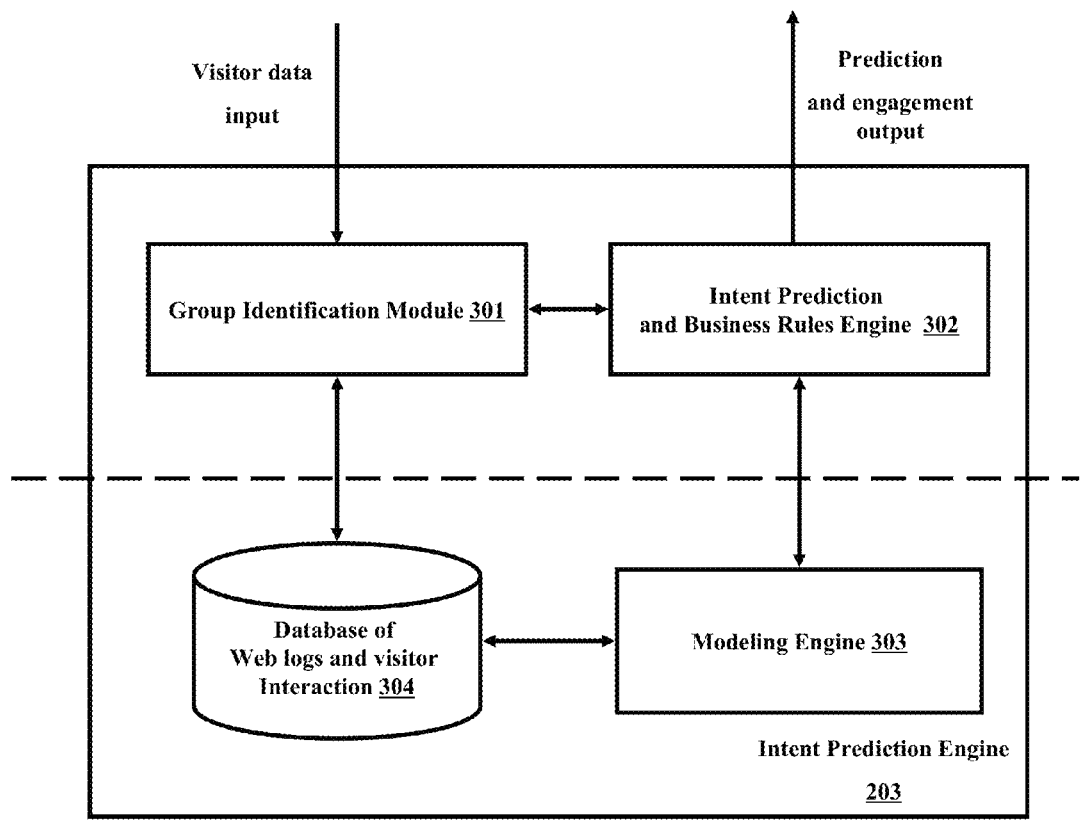
FIG. 3 is a block schematic diagram that depicts an intent prediction engine according to the invention.

On detecting a visitor 101 accessing an application served by the servers 104, the intent prediction engine 203 categorizes the visitor into one or more pre-defined groups of visitors by modeling the visitor behavior with respect to previous population of visitors in the relevant groups identified, for example based on the partial Web journey, such as location, referral used, landing page, and so on of the visitor 101, and predicts the intention of the visitor 101 based on modeling of the visitor behavior. The intent prediction engine 203, based on the predicted intent, proactively offers suitable personalized recommendations and/or best multichannel support to the visitor 101, such as personalized recommendation using a suitable widget, chat engagement, and so on FIG. 3 is a block schematic diagram that shows an intent prediction engine according to the invention. The intent prediction engine 203 comprises a group identification module 301, an intent prediction and business rules engine 302, a modeling engine 303, and a database 304. It should be appreciated that the presently preferred embodiment of the invention does not require two databases. Historical data is needed to build behavioral models. Once these models are built, the historical data is no longer needed. Once the system is deployed, visitor data is fetched and put into the database. At this point, the database contains the models, group classification data, and new user data over which prediction and/or models are to run.

The database 304 stores, for example, the locations of the visitors, time of visit, referral page, landing and exit pages, visitor interaction information, Weblog, and chat and voice-call transcripts from e-commerce websites and other sources. This data can be of the type comprising numerical, text, or categorical information. The data may be organized into a suitable structured format, such as a rectangle table or row-by-column format, and stored. The structured format is chosen such that various machine learning and data mining techniques can be applied on the structured data, such as a logistic regression model, decision trees, artificial neural network, support vector machine, and so on An intent group includes a set of visitors who have the same predicted intent, have exhibited similar behavior in some aspect, and have a set of common attributes. The group identification module 301 identifies suitable homogenous groups of online visitors based on various factors, such as location of the user, using a suitable means such as IP, ISP name, and so on; referral source, such as email, search engines, social media, and so on; landing page and/or exit page, day and time of visit, visitor interaction information, past purchase history, and so on. In an embodiment, the group identification module 301 fetches the required factors from the prediction engine database 304. The group identification module 301 may use algorithms, such as probabilistic latent semantic analysis (PLSA), K-means, self-organizing maps, and such similar techniques for identification. The group identification module 301 also identifies significant discriminatory features which may be used for forming the groups. The groups may be formed based on similar locations, similar day and time of visits, past purchase patterns, and other suitable behavioral patterns.

Once the homogenous groups are identified which are based on historical data, the modeling engine 303 develops models for visitor behavior for each of the groups and stores the models in the database 304. The groups so identified are configured by a website administrator, with each group associated with the associate weights and a set of one or more attributes, such as location, time of visit, and landing page. These weights are identified by such methods as PLSA.

On detecting a visitor 101 accessing an application served by the servers 104, the group identification module 301 categorizes the visitor into one or more pre-defined groups of visitors by modeling the visitor behavior with respect to previous population of visitors in the relevant groups identified. The rules engine 302 uses machine learning models, such logistic regression, decision trees, support vector machine, and so on to predict the intent of a visitor 101, once the visitor has been grouped into one of the identified groups. The rules engine 302 may use suitable methods, such as model-based cluster analysis or PLSA combined with Markov models, to discover the visitor's intent. The model used by the rules engine 302 may depend on the group into which the visitor 101 has been classified. The rules engine 302 may use session-wise data, where the data may comprise clickstreams of visitors, for example, page views, time spent on each page, and so on. The intent predicted by the rules engine 302 may be that, for example, the visitor 101 wants to perform a search to gather information about certain products, the visitor 101 wants to browse to gain knowledge, the visitor 101 wants to compare various products and accessories, the visitor 101 wants to purchase certain products, and so on. The intent predicted by the rules engine 302 may also be that the visitor 101 wants to update any of his account details, shopping cart related information, payment related information, and so on.

The modeling engine 303 provides models to target the right visitors at the right time by offering intervention strategies in the form of personalized recommendations and suitable multichannel support to increase purchase propensity, enhance the self-service experience, reduce the deflection rate, or some other suitable business metrics. The modeling engine 303 may use models such as Markov models of higher orders combined with Neural Network, Support Vector machine, Collaborative filtering, Sequential Pattern methods, Survival Analyses, and some such similar tools. Based on a partial navigational path, i.e. the sequence of pages visited by the visitor 101, the modeling engine 303 models the next action of the visitor 101 as the visitor 101 performs the journey, and at each stage, the modeling engine 303 decides what appropriate pre-emptive action and/or engagement strategy can be taken to maximize the metrics of interest, such as conversion rate or resolving the visitor's 101 problems (resolution rate). The modeling engine 303 may perform design of experiments (DoE) and/or combinatorial optimization for identifying suitable engagement strategies. The modeling engine 303 computes channel affinity for each couplet, such as affinity towards chat engagement, affinity towards using self-help, seeking help thru FAQ's, telephone calls, and so on by computing a channel friction score. The channel friction score can be computed based on the response to various channel supports offered to the visitors after performing the analysis of DoE's and selects a suitable engagement strategy, such as chat offer, email, calls, and so on, based on the computed channel friction score.

The modeling engine 303 may also select an appropriate time to trigger the engagement strategy, based on a plurality of factors comprising, but not limited to, the time and/or time range that the visitor 101 spends on a Web page in the domain. For example, the modeling engine 303 may select a suitable page in the navigation path and time delay on the particular page for triggering a chat-based engagement strategy so that the visitor 101 is likely to accept the chat offer and, consequently, this leads to an increased chat offer acceptance rate. The modeling engine 303 may also select more than one engagement strategy. The engagement strategy could be any of, but not limited to, offering personalized recommendations; offering a better mode of multichannel support, e.g. at least one of proactive chat, reactive chat, voice-based media, self service media, or any other suitable interactive medium; and offering discounts and promotional offers. For example, consider a visitor 101 who visits multiple pages related to a product and/or issue. In this case, the modeling engine 303 may suggest interesting products and/or issue resolution solutions based on segmentation and the Web journey of the visitor 101. In another example, for a visitor 101 having a high bounce rate and low page visits, the modeling engine 303 may offer chat services as the engagement strategy. One of the primary reasons for selecting the chat engagement as a preferred mode of Web support over the traditional call centers is that it reduces the customers wait time, as well as substantially reducing the cost incurred in call centers. In a third example, for a visitor 101 who exhibits specific transaction features, such as visiting cart and/or purchase pages quickly in the session, the modeling engine 303 may suggest a customized chat and/or self-help widget offering as the engagement strategy to drive the visitor 101 to make the purchase.

The intent prediction engine 203 further comprise a feedback mechanism, wherein the data related to a visitor, the engagement strategy chosen, and the outcome and/or response is analyzed and used for further refining the process, as disclosed above.

Figure 4:
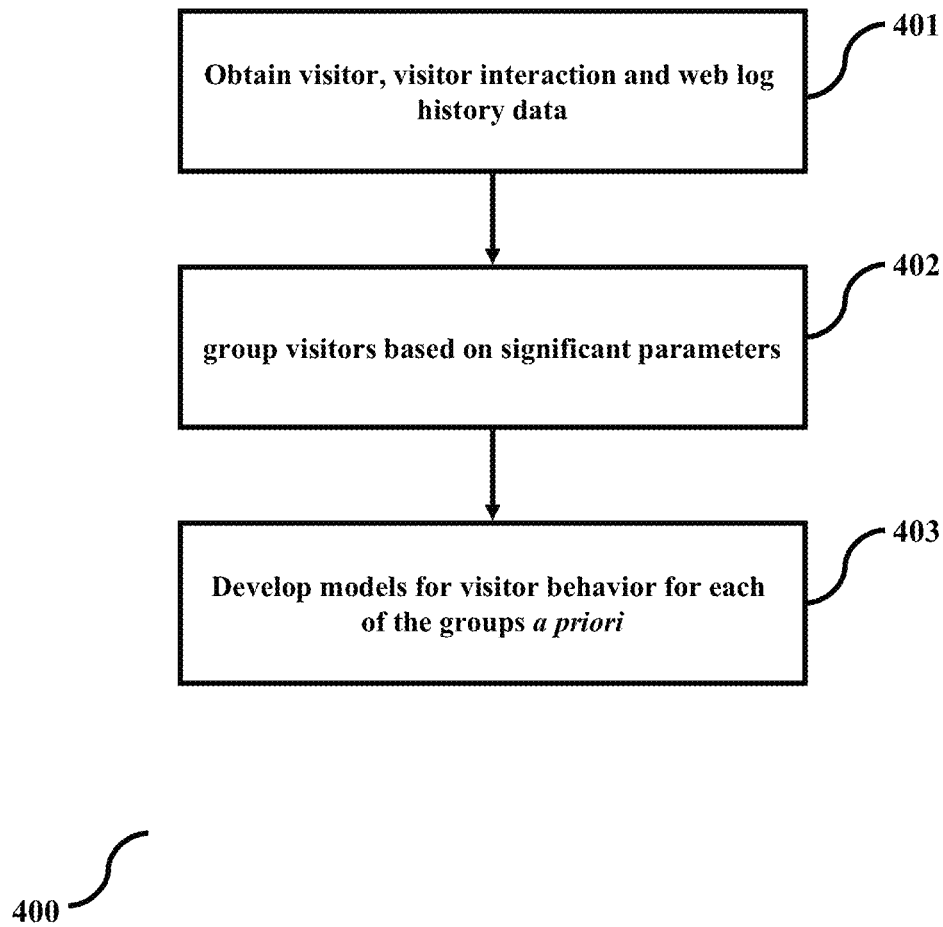
FIG. 4 is a flowchart depicting a process for developing an intent model, based on historical data, by grouping visitors into a plurality of groups according to the invention.

FIG. 4 is a flowchart depicting a process of grouping visitors into a plurality of groups according to the invention. The intent prediction engine 203 fetches (401) a plurality of factors comprising, for example, locations of the visitors, time of visit, referral page, landing and/or exit pages, visitor interaction information, past purchase history, and so on related to visitors. The intent prediction engine 203 groups (402) the visitors based on the plurality of factors into a plurality of groups. The groups may be formed on the basis of behavior of the visitors, which may be based on the above mentioned plurality of factors. The intent prediction engine 203 further develops (403) models for visitor behavior for each of the groups. The various actions in method 400 may be performed in the order presented, in a different order, or simultaneously. Further, in some embodiments, some actions listed in FIG. 4 may be omitted.

Figure 5:
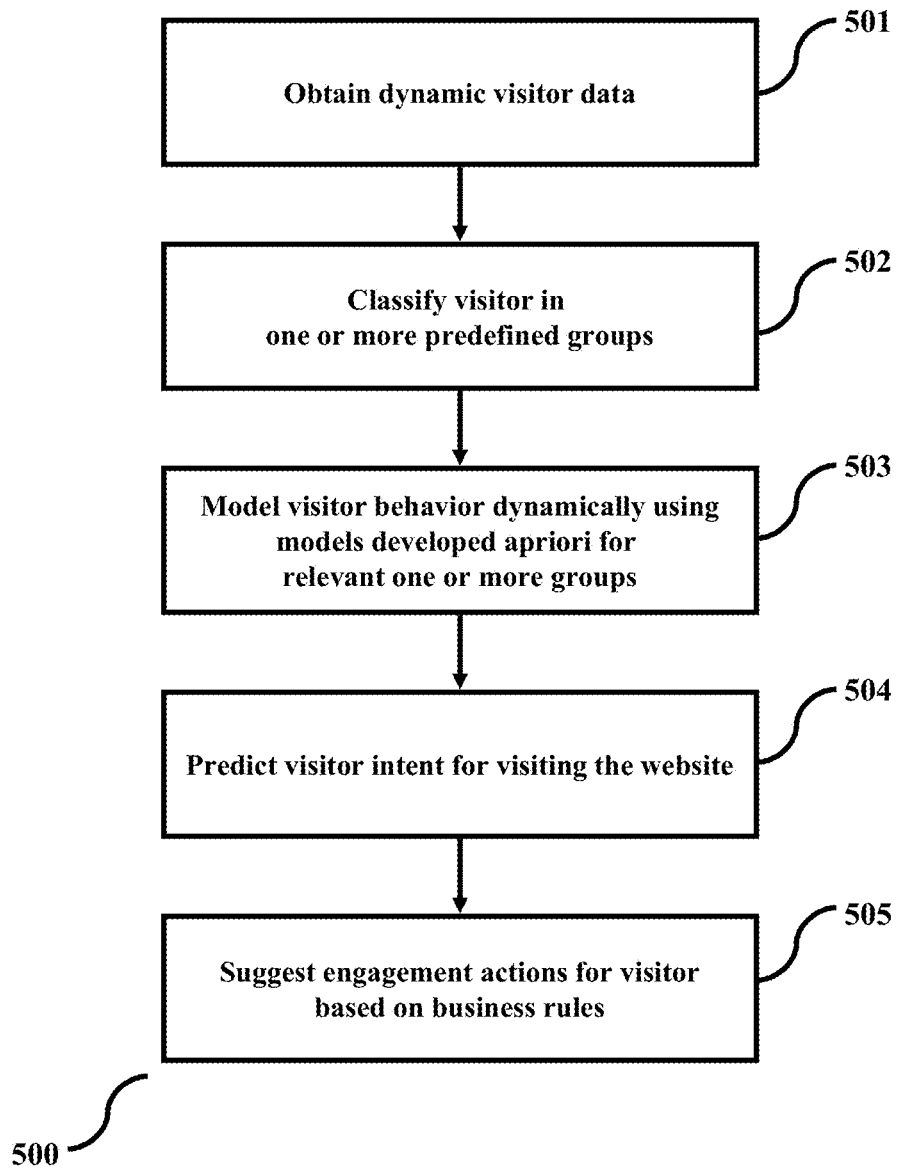
FIG. 5 is a flowchart depicting a process for using the intent model to predict customer intent by grouping current visitors into a plurality of groups and suggesting appropriate actions according to the invention.

FIG. 5 is a flowchart depicting a process of predicting the current visitors into a plurality of groups and suggesting appropriate actions according to the invention. On detecting a visitor 101 accessing an application served by the servers 104, the intent modeling engine 203 obtains (501) partial Web journey data, such as location of the visitor, time of visit, referral page, landing pages, visitor interaction information, and so on. The intent modeling engine 203 further classifies (502) the visitor into one or more identified groups of visitors in (403) and models (503) the visitor behavior with respect to previous population of visitors in the relevant group identified. The intent modeling engine 203 predicts the intention of the visitor 101 based on modeling of the visitor behavior. The intent modeling engine 203, based on the predicted intent, proactively suggests (505) suitable personalized engagement actions which may be in the form of recommendations and/or best multichannel support to the visitor 101. The various actions in method 500 may be performed in the order presented, in a different order or simultaneously. Further, in some embodiments, some actions listed in FIG. 5 may be omitted.

Figure 6:
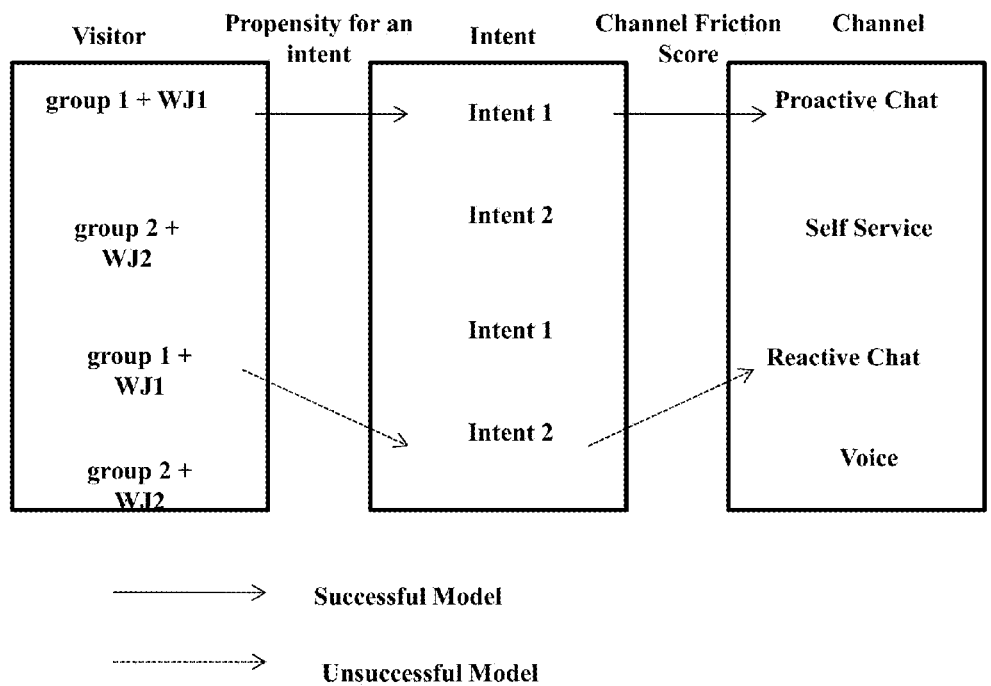
FIG. 6 is a block diagram that shows an example of analyzing visitor attributes and responding to the visitor's predicted intent according to the invention.

FIG. 6 is a block diagram that shows an example of analyzing visitor attributes and responding to the visitor's predicted intent according to the invention. FIG. 6 depicts a combination of a visitor profile and a web journey of the visitor mapped to the intent of the visitor and the engagement strategy chosen for the visitor in the form of a channel.

Table 1 below depicts information related to a visitor visiting an e-commerce related domain, the Web journey before landing on the domain, the intent of the visitor, the engagement strategy chosen for the visitor, and the outcome.

TABLE 1

| Segment | Web Journey | Intent | Engagement | Outcome |
|---|---|---|---|---|
| Age 20-30/west coast | Account-Cart-Purchase | Purchase | Self Serve | Purchase |
| Age 30-50 East Coast | Product-Sub product-Comparison | Search/Purchase | Proactive Chat | Purchase |
| Age 50-65/mid west | Account-Summary-Credit Card Surcharge | Issue Resolution | Call | Resolution |
| Old customer/frequency login history | Account-history-past transaction | Surfing/Info check | Self Serve | Purchase/Resolution |
| New customer/not logged in last 7 days | Home-account-new promotions | Prospect | Proactive chat/call | Purchase/Resolution |
| New customer/logged in 3 times in 3 days | Product-Sub product-Product | Info/Purchase | Proactive Chat | Purchase/Resolution |

Table 2 below depicts information related to a visitor visiting a services related domain, the Web journey before landing on the domain, the intent of the visitor, the engagement strategy chosen for the visitor, and the outcome. Also, depicted below are the propensity intent score and the channel friction score.

TABLE 2

| Segment | Web Journey | Intent | Propensity intent score | Engagement | Channel Friction Score | Outcome |
|---|---|---|---|---|---|---|
| New customer on boarding | Home-Search-Payments-FAQ | Dispute Payments | Low | Proactive Chat | High | Not resolved |
| New customer on boarding | Home-Search-Payments-FAQ | Dispute Payments | Low | Call | High | Not resolved |
| New customer on boarding | Home-Search-Payments-FAQ | Make a payment | High | Proactive Chat | Low | Resolved |
| New customer on boarding | Home-Search-Payments-FAQ | Make a payment | High | Call | Low | Not resolved |

Embodiments disclosed herein may be applied to Web-based business, such as e-commerce, service, and so on, to understand the intentions of a visitor to one or more websites, for example to increase online sales and/or resolutions by offering personalized recommendations based on the visitor's intent, to identify timing of offering better mode of multichannel engagement to increase purchase and/or resolution propensity, and to reduce the deflection rate.

Embodiments disclosed herein enable optimization of key business metrics. These metrics may be incremental in nature, such as an increased conversion rate due to the engagement strategy; they may driven purely by metrics, such as resolution rate, i.e. % of customers who are able to solve the issues via various engagement strategies; or they may be survey based, such as customer satisfaction which is usually based on surveys taken after the engagement. Optimization of metrics might also mean minimization of the metric, as in the case of customer effort, e.g. measured via survey or time spent of the Web site to solve a problem, or other methods. These metrics might also be based on plurality of channels, such as call deflection rate, i.e. % of customers who browse the Web and then call the contact center to resolve the problem. Other metrics include usage rate of the channel, etc.

In one particular instance, the strategies developed using the described framework have shown 700% increase in conversion rate when compared to customers with similar intent and not being provided any engagement. Embodiments herein enable successful models to be produced by the DoE framework and, based on selection of more successful models, achieve better performance metrics.

Embodiments herein also enable identification of online visitors who have chatted with agents and did not make the purchase, but are potential targets for purchase.

Computer Implementation

Figure 7:
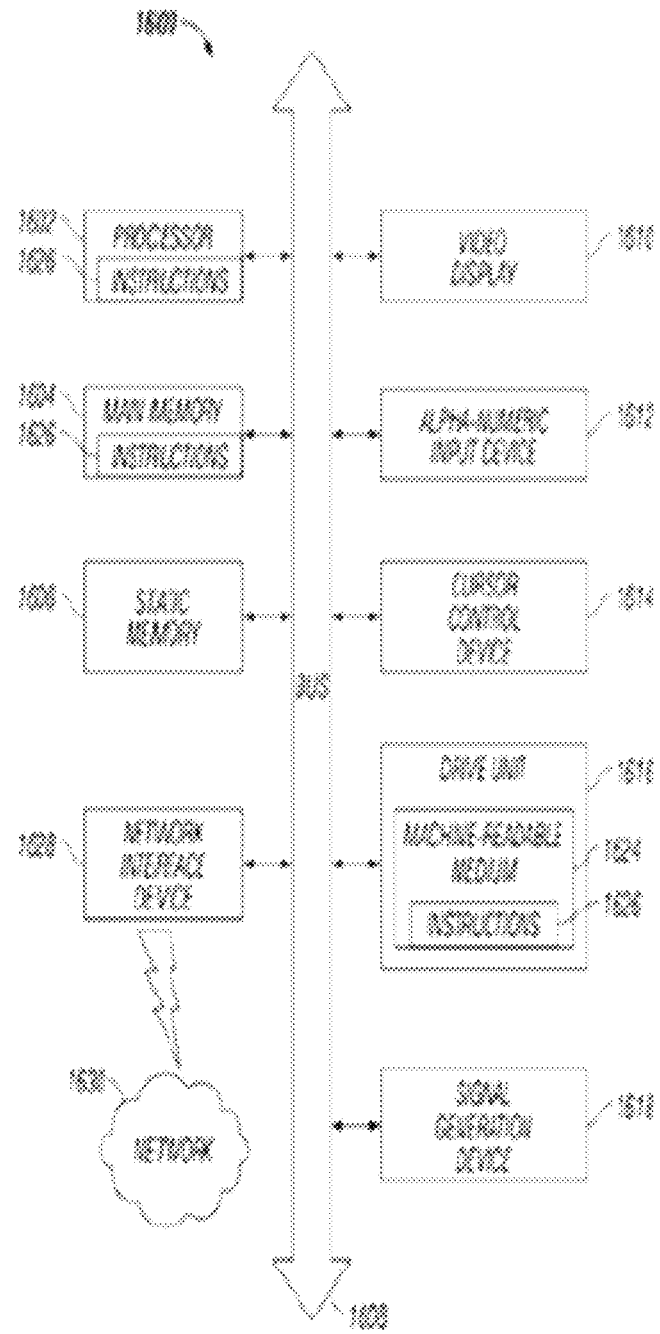
FIG. 7 is a block schematic diagram that depicts a machine in the exemplary form of a computer system within which a set of instructions for causing the machine to perform any of the herein disclosed methodologies may be executed.

FIG. 7 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e., software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for addressing needs of a particular visitor accessing a website, comprising:
   a processor collecting information about each visitor of a plurality of visitors accessing the website and storing the information as historical visitor information in a database;
   said processor training a visitor intent model based on said historical visitor information stored in the database;
   said processor fetching from said database a plurality of factors comprising any of locations of the visitors, time of visit, referral page, landing and/or exit pages, visitor interaction information, and past purchase history related to said plurality of visitors;
   said processor using behavior of said plurality of visitors to form a plurality of groups, said behavior comprising any of said plurality of factors;
   said processor using said plurality of factors to group said plurality of visitors into one or more groups of said plurality of groups;
   said processor developing models for said visitor behavior for each of said groups;
   said processor collecting information about a particular visitor accessing the website;
   said processor determining a group with which to associate the particular visitor based on the collected information about the particular visitor by modeling said visitor behavior with respect to a previous population of visitors in an identified group;
   after the visitor intent model is trained, said processor predicting intent of said particular visitor accessing the website based on information about the particular visitor and the visitor intent model by executing the visitor intent model to determine the predicted intent of the particular visitor based upon the group associated with the particular visitor and the information collected about the particular visitor.

2. The method of claim 1, further comprising:
   said processor determining an engagement strategy for helping a particular visitor to be successful in achieving the predicted intent; and
   said processor engaging the particular visitor using the determined engagement strategy.

3. The method of claim 2, wherein the engagement strategy comprises any of:
   offering proactive recommendations;
   offering chat services;
   initiating a telephone call to the visitor;
   inviting a telephone call from the visitor;
   providing a customer chat and/or widget;
   offering a discount; and
   providing a promotional offer.

4. The method of claim 1, wherein the information collected about each visitor comprises any of:
   location of the visitor;
   day and time at which the visitor accessed the website;
   length of time the visitor interacts with the website;
   past purchase history;
   source of referral to the website comprising any of email, search engines, social media, and other websites;
   device used for interaction;
   operating system and version;
   Internet browser and version;
   IP address;
   first page within the website accessed by the visitor;
   log of Web accesses within the website;
   online chat transcript;
   voice call transcripts; and
   visitor interaction information.

5. The method of claim 1, wherein the intent of the particular visitor comprises any of:
   browse the website;
   collect information for investigation or research;
   purchase a product;
   check status on a purchase order;
   make a payment;
   dispute a payment;
   issue resolution;
   schedule an appointment; and
   schedule an on-site service call.

6. A computer implemented method for assessing visitor interactions with a website, comprising:
   a processor implementing an intent prediction engine for receiving information from a visitor accessing said website;
   said intent prediction engine segmenting visitors to said website into one or more of a plurality of groups based on a plurality of factors;
   said intent prediction engine developing models for visitor behavior for each of said groups, wherein said intent prediction engine comprises:
      a group identification module for identifying suitable homogenous groups of online visitors based on factors comprising any of location of the visitor, referral source, landing page and/or exit page, day and time of visit, and visitor interaction information, past purchase history; and wherein said group identification module categorizes each visitor into one or more pre-defined groups of visitors by modeling the visitor behavior with respect to previous population of visitors in the relevant groups identified;

an intent prediction and business rules engine for using machine learning models to identify a visitor's intent, once the visitor has been grouped into one of the identified groups;

a modeling engine for developing said models for visitor behavior for each of said groups and for storing said models in said prediction engine database;

wherein said modeling engine provides models to target appropriate visitors at an appropriate time by offering intervention strategies; and said prediction engine database storing visitor information in a structured format, said visitor information comprising any of locations of visitors, time of visit, referral page, landing and exit pages, visitor interaction information, past purchase history, and chat and voice-call transcripts from e-commerce websites and other sources; and on detecting a visitor accessing said website, said intent prediction engine identifying characteristics of said visitor, categorizing said visitor into one or more of said groups, modeling said visitor's behavior with respect to a previous population of visitors in the relevant groups identified, and predicting an intention of the visitor based on modeling of said visitor's behavior.

7. The method of claim 6, wherein based upon said predicted intent, said intent prediction engine proactively offering personalized recommendations and/or best multichannel support to said visitor.

8. The method of claim 6, wherein an intent group comprises a set of visitors who have a same predicted intent, have exhibited a similar behavior in some aspect, and have a common attribute.

9. The method of claim 6, wherein the intent predicted by said rules engine comprises any of:
the visitor wants to perform a search to gather information about certain products;
the visitor wants to browse to gain knowledge;
the visitor wants to compare various products and accessories;
the visitor wants to purchase certain products; and
the visitor wants to update any of account details, shopping cart related information, and payment related information.

10. The method of claim 6, wherein based on a partial Web journey of the visitor, said modeling engine models a next action of the visitor as the visitor performs the Web journey, and at each stage, the modeling engine decides what appropriate pre-emptive action and/or engagement strategy can be taken to maximize metrics of interest.

11. The method of claim 6, wherein said modeling engine computes channel affinity for each couplet by computing a channel friction score and selects a suitable engagement strategy based on the computed channel friction score.

12. The method of claim 6, wherein said modeling engine selects an appropriate time to trigger an engagement strategy, based on a plurality of factors comprising, but not limited to, the time and/or time range that the visitor spends on a Web page in a website.

13. The method of claim 12, wherein said modeling engine selects more than one engagement strategy.

14. The method of claim 6, wherein said engagement strategy comprising any of:
offering personalized recommendations;
offering a better mode of multichannel support; and
offering discounts and promotional offers.

15. The method of claim 6, wherein said intent prediction engine comprises a feedback mechanism, wherein data related to a visitor, an engagement strategy chosen, and an outcome and/or response is analyzed and used for further refinement.

16. The method of claim 6, said intent modeling engine, based on a predicted intent, proactively suggesting suitable personalized engagement actions in the form of recommendations and/or best multichannel support to the visitor.

17. An apparatus for addressing needs of a particular visitor accessing a website, comprising:
a processor collecting information about each visitor of a plurality of visitors accessing the website and storing the information as historical visitor information in a database;
said processor training a visitor intent model based on said historical visitor information stored in the database;
said processor fetching from said database a plurality of factors comprising any of locations of the visitors, time of visit, referral page, landing and/or exit pages, visitor interaction information, and past purchase history related to said plurality of visitors;
said processor using behavior of said plurality of visitors to form a plurality of groups, said behavior comprising any of said plurality of factors;
said processor using said plurality of factors to group said plurality of visitors into one or more groups of said plurality of groups;
said processor developing models for said visitor behavior for each of said groups;
said processor, after the visitor intent model is trained, predicting intent of said particular visitor accessing the website based on information about the particular visitor and the visitor intent model by executing the visitor intent model to determine the predicted intent of the particular visitor based upon the group associated with the particular visitor and the information collected about the particular visitor;
said processor configured for determining an engagement strategy for helping said particular visitor to be successful in achieving the predicted intent; and
said processor engaging the particular visitor using the determined engagement strategy.

18. An apparatus for assessing visitor interactions with a website, comprising:
a processor implementing an intent prediction engine for receiving information from a visitor accessing said website;
said intent prediction engine segmenting visitors to said website into one or more of a plurality of groups based on a plurality of factors comprising any of locations of the visitors, time of visit, referral page, landing and/or exit pages, and visitor interaction information;
said intent prediction engine developing models for visitor behavior for each of said groups;
said intent prediction engine comprising:
a group identification module for identifying suitable homogenous groups of online visitors based on factors comprising any of location of the visitor, referral source, landing page and/or exit page, day and time of visit, and visitor interaction information; and wherein said group identification module categorizes each visitor into one or more pre-defined groups of visitors by modeling the visitor behavior with respect to previous population of visitors in the relevant groups identified;

an intent prediction and business rules engine for using dynamic models to identify a visitor's intent, once the visitor has been grouped into one of the identified groups;

a modeling engine for developing said dynamic models for visitor behavior for each of said groups and for storing said models in said prediction engine database;

wherein said modeling engine provides models to target appropriate visitors at an appropriate time by offering intervention strategies; and said prediction engine database storing visitor information in a structured format, said visitor information comprising any of locations of visitors, time of visit, referral page, landing and exit pages, visitor interaction information, data, weblog, and chat and voice-call transcripts from e-commerce websites and other sources; and on detecting a visitor accessing said website, said intent prediction engine identifying characteristics of said visitor, categorizing said visitor into one or more of said groups, modeling said visitor's behavior with respect to a previous population of visitors in the relevant groups identified, and predicting an intention of the visitor based on modeling of said visitor's behavior.

* * * * *